United States Patent
Shin et al.

(10) Patent No.: US 11,010,524 B2
(45) Date of Patent: May 18, 2021

(54) METHOD FOR SIMULATING CHARACTERISTICS OF SEMICONDUCTOR DEVICE

(71) Applicant: Korea Advanced Institute of Science and Technology, Daejeon (KR)

(72) Inventors: Mincheol Shin, Daejeon (KR); Woo Jin Jeong, Daejeon (KR); Jaehyun Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 544 days.

(21) Appl. No.: 15/949,268

(22) Filed: Apr. 10, 2018

(65) Prior Publication Data

US 2018/0293342 A1 Oct. 11, 2018

(30) Foreign Application Priority Data

Apr. 11, 2017 (KR) .................. 10-2017-0046768

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01)

(58) Field of Classification Search
CPC ................... G06F 30/367; G06F 2119/06
See application file for complete search history.

(56) References Cited

U.S. PATENT DOCUMENTS

| | | | | |
|---|---|---|---|---|
| 2011/0313741 A1* | 12/2011 | Langhoff | ............... | G16C 20/30 703/2 |
| 2015/0088473 A1* | 3/2015 | Liu | .................. | G06F 30/33 703/2 |
| 2015/0142398 A1* | 5/2015 | Miller, III | ............. | G16C 10/00 703/2 |
| 2018/0129765 A1* | 5/2018 | Stokbro | ............... | G06F 30/367 |

* cited by examiner

*Primary Examiner* — Bijan Mapar
(74) *Attorney, Agent, or Firm* — Daly, Crowley Mofford & Durkee, LLP

(57) ABSTRACT

Disclosed is a method for simulating characteristics of a semiconductor device. An overlap matrix and a Hamiltonian representing atomic interaction energy information of a target semiconductor device are extracted by using a density functional theory (DFT), and Bloch states for corresponding energies are calculated based on the Hamiltonian, the overlap matrix, and energy-k relation within an effective energy region. A first reduced Hamiltonian and a first reduced overlap matrix having a reduced matrix size are obtained by applying the Hamiltonian and the overlap matrix to a transformation matrix that is obtained by orthonormalizing a matrix representing the Bloch states. A final transformation matrix and a final energy band structure where all unphysical branches, which are energy bands not corresponding to a first energy band structure in a second energy band structure, are removed within the effective energy region are calculated.

11 Claims, 12 Drawing Sheets

FIG. 11

| NW WIDTH (nm) | ENERGY WINDOW | # OF ITERATIONS | AVG. CPU TIME PER INERATION (sec) | SIZE OF REDUCED HAMILTONIAN | SIZE OF ORIGINAL HAMILTONIAN | SIZE-REDUCTION RATIO(%) |
|---|---|---|---|---|---|---|
| 1.08 | CB | 4 | <1 | 20 | 1001 | 2.0 |
| | VB | 2 | <1 | 19 | 1001 | 1.9 |
| 2.16 | CB | 54 | 15 | 61 | 2769 | 2.2 |
| | VB | 18 | 18 | 62 | 2769 | 2.2 |
| 3.24 | CB | 77 | 102 | 119 | 5369 | 2.2 |
| | VB | 46 | 138 | 108 | 5369 | 2.0 |

METHOD FOR SIMULATING CHARACTERISTICS OF SEMICONDUCTOR DEVICE

CROSS-REFERENCE TO RELATED APPLICATION

This application claims priority under 35 USC § 119 to Korean Patent Application No. 10-2017-0046768 filed on Apr. 11, 2017 in the Korean Intellectual Property Office (KIPO), the entire disclosure of which is incorporated herein by reference.

BACKGROUND

1. Field

The present invention relates to a method for simulating a semiconductor device, and more particularly, to a simulation method for calculating an energy band structure and an I-V characteristic of a semiconductor device.

2. Description of the Related Art

As research and development on high integration and miniaturization of transistors have been made, transistors using a technique for manufacturing a complementary metal oxide semiconductor (CMOS) of 100 nm or less are being commercialized. In recent years, techniques for shortening a channel length of a transistor to 10 nm or less are being developed, and research and development on a three-dimensional device manufacturing process such as an ultra-thin-body (UTB), a fin field-effect transistor (FinFET), and a gate-all-around (GAA) FET are being made.

As the channel length is reduced to the level of several nanometers (nm), only several hundreds to several thousands of atoms are present in the device, and thus influence of single atomic interaction is increased, so that a modeling approach in a level of an atomic unit is necessary. This can be implemented based on the wave nature of electrons, that is, a quantum-mechanical simulation based on a Schrödinger equation.

Typically, a tight-binding (TB) model called as a linear combination of atomic orbitals (LCAO) approximation is used as a technique for the above simulation. For example, the simulation can be performed by setting atom arrangement as a periodic lattice arrangement, and quantum-mechanically obtaining a solution of the Schrödinger equation taking into consideration the interaction with adjacent atoms. The TB model scheme may take into consideration a type of atoms, a structural change of an atomic level, coupling between an electron spin and an orbital, and the like, and is used for simulating a nanometer-level semiconductor device.

However, referring to the TB model scheme, it is necessary to verify whether parameters calculated from a bulk structure are applicable to a nanoscale structure or a heterojunction structure, and only interaction with adjacent atoms is taken into consideration, so that reliability on the precision and accuracy of an atomic-level simulation for a nanoscale semiconductor device may be deteriorated.

Meanwhile, a size of Hamiltonian containing atomic information of the simulation is proportional to the number of atoms in a unit cell and the number of orbitals of the atom. Therefore, when the simulation is applied to a transistor device that is currently being developed, calculations for a matrix of several millions×several millions should be performed so that a very large-sized memory and a long calculation time are required.

SUMMARY

It is an object of the present invention to provide a method for simulating characteristics of a semiconductor device based on a density functional theory (DFT), in which Hamiltonian is reduced to calculate an energy band structure and/or a voltage-current characteristic.

However, objects of the present invention are not limited to the above-described objects, but variously modified without departing from the spirit and scope of the present invention.

To achieve one object of the present invention, according to embodiments of the present invention, there is provided a method for simulating characteristics of a semiconductor device. The method includes extracting an overlap matrix and a Hamiltonian representing atomic interaction energy information of a target semiconductor device by using a DFT; and calculating Bloch states for corresponding energies based on the Hamiltonian, the overlap matrix, and energy-k relation within an effective energy region. The method also includes obtaining a first reduced Hamiltonian and a first reduced overlap matrix having a reduced matrix size by applying the Hamiltonian and the overlap matrix to a transformation matrix that is obtained by orthonormalizing a matrix representing the Bloch states; and calculating a final transformation matrix and a final energy band structure where all unphysical branches, which are energy bands not corresponding to a first energy band structure in a second energy band structure, are removed from the effective energy region by comparing the first energy band structure calculated based on the Hamiltonian and the overlap matrix with the second energy band structure calculated based on the first reduced Hamiltonian and the first reduced overlap matrix.

According to one embodiment, the calculating of the final transformation matrix and the final energy band structure may include: calculating a second eigenvalue number, which is a number of eigenvalues included in the second energy band structure; comparing a first eigenvalues number, which is a number of eigenvalues included in the first energy band structure, with the second eigenvalue number; adding an additional basis to the transformation matrix by generating the additional basis for removing the unphysical branches from the effective energy region when the second eigenvalue number is greater than the first eigenvalue number; and determining the transformation matrix to which the additional basis is added as the final transformation matrix when the second eigenvalue number converges to the first eigenvalue number.

According to one embodiment, the adding of the additional basis to the transformation matrix may include: recalculating the second eigenvalue number in an energy band obtained by an intermediate transformation matrix to which the additional basis is added; and adding a new additional basis to the transformation matrix by generating the new additional basis for removing the unphysical branches from the effective energy region when the recalculated second eigenvalue number is greater than the first eigenvalue number.

According to one embodiment, the adding of the additional basis to the transformation matrix may include repetition of recalculating the second eigenvalue number, and generating and adding the additional basis to the transformation matrix until the second eigenvalue number converges to the first eigenvalue number.

According to one embodiment, the additional basis may be generated based on a variable vector calculated through a minimization function that maximizes an absolute value of a difference between the second eigenvalue number obtained by an $i^{th}$ transformation matrix (wherein i is a natural number) to which an $i^{th}$ additional basis is applied, and the second eigenvalue number obtained by an $(i-1)^{th}$ transformation matrix to which an $(i-1)^{th}$ additional basis is applied.

According to one embodiment, the obtaining of the first reduced Hamiltonian and the first reduced overlap matrix may include: generating a normal orthogonal basis obtained by orthonormalizing the matrix representing the Bloch states; outputting the transformation matrix where states having a value smaller than a preset reference value are removed from the normal orthogonal basis; and outputting the first reduced Hamiltonian and the first reduced overlap matrix by applying the Hamiltonian and the overlap matrix to the transformation matrix.

According to one embodiment, the effective energy region may be set based on at least one of a conduction band edge and a valence band edge depending on a type of the semiconductor device.

According to one embodiment, the Bloch states may be calculated from the Hamiltonian and the overlap matrix by applying an eigenvalue extraction scheme for a Schrödinger equation.

According to one embodiment, the method for simulating the characteristics of the semiconductor device may further include calculating a current characteristic of the target semiconductor device based on a second reduced Hamiltonian and a second reduced overlap matrix where an initial potential, which is a preset external potential component, is added to the first reduced Hamiltonian and the first reduced overlap matrix.

According to one embodiment, the calculating of the current characteristic of the target semiconductor device may include: obtaining the second reduced Hamiltonian and the second reduced overlap matrix based on the first reduced Hamiltonian, the first reduced overlap matrix, and the initial potential; calculating an electron density by applying the second reduced Hamiltonian and the second reduced overlap matrix to a non-equilibrium Green's function (NEGF); updating the initial potential by applying the electron density to a Poisson's equation; and calculating a potential difference between the initial potential and the updated potential of the second reduced Hamiltonian. A current density and a current may be calculated by using the updated potential when the potential difference is equal to or less than a preset threshold value, and the second reduced Hamiltonian may be updated with the updated potential when the potential difference exceeds the threshold value.

According to one embodiment, the potential and the second reduced Hamiltonian may be updated by repeating extraction of the Poisson's equation and the NEGF in a self-consistent scheme until the potential difference converges to the threshold value or less.

According to embodiments of the present invention, the method for simulating a semiconductor device can significantly reduce the size of the Hamiltonian in a DFT-based transport operation and an energy band structure calculation operation, thereby significantly reducing the memory and time required for the operation. Therefore, various accurate simulations for actual semiconductor device sizes can be implemented.

However, effects of the present invention are not limited to the above-described effect, but variously modified without departing from the spirit and scope of the present invention.

BRIEF DESCRIPTION OF THE DRAWINGS

FIG. 11 is a view showing an example of a result in which an operation load is reduced by the method for simulating the characteristics of the semiconductor device according to embodiments of the present invention.

DETAILED DESCRIPTION OF THE EMBODIMENTS

Figure 1:
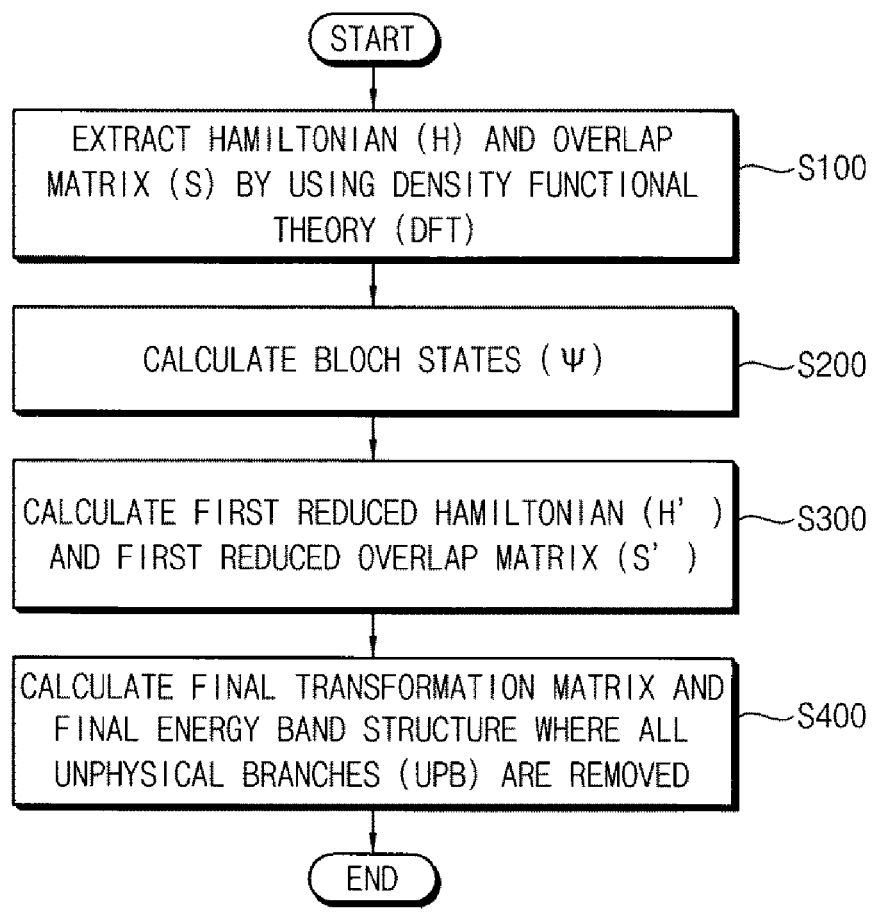
FIG. 1 is a flowchart for explaining a method for simulating characteristics of a semiconductor device according to embodiments of the present invention.

Hereinafter, preferred embodiments of the present invention will be described in detail with reference to the accompanying drawings. Identical elements will be given the same reference numerals in the drawings, and any redundant description of the identical elements will be omitted.

FIG. 1 is a flowchart for explaining a method for simulating characteristics of a semiconductor device according to embodiments of the present invention.

Referring to FIG. 1, a method for simulating characteristics of a semiconductor device includes: extracting an overlap matrix and a Hamiltonian representing atomic interaction energy information of a target semiconductor device by using a density functional theory (DFT) (S100); calculating Bloch states for corresponding energies based on the Hamiltonian, the overlap matrix, and energy-k (E-k) relation within an effective energy region (S200); obtaining a first reduced Hamiltonian and a first reduced overlap matrix having a reduced matrix size by applying the Hamiltonian and the overlap matrix to a transformation matrix that is a normal orthogonal basis obtained by orthonormalizing a matrix representing the Bloch states (S300); and calculating a final transformation matrix and a final energy band structure where all unphysical branches, which are energy bands not corresponding to a first energy band structure in a second energy band structure, are removed within the effective energy region by comparing the first energy band structure calculated based on the Hamiltonian and the overlap matrix with the second energy band structure calculated based on the first reduced Hamiltonian and the first reduced overlap matrix (S400).

In one embodiment, the method for simulating the characteristics of the semiconductor device may obtain energy band information of a semiconductor device channel region by using a quantum-mechanical scheme. The semiconductor device may be an n-channel field effect transistor (n-FET), a p-channel field effect transistor (p-FET), a tunnel field effect transistor (tunnel-FET), or the like having a structure of bulk, UTB, FinFET, nanowire, etc.

In one embodiment, the simulation method may extract a non-equilibrium Green's function (NEGF) and a Poisson function using a self-consistent scheme to calculate a charge density and a current of the semiconductor device, and accordingly obtain an I-V characteristic of the semiconductor device.

Specific features of the simulation method will be described in detail with reference to FIGS. 2 to 10.

Figure 2:
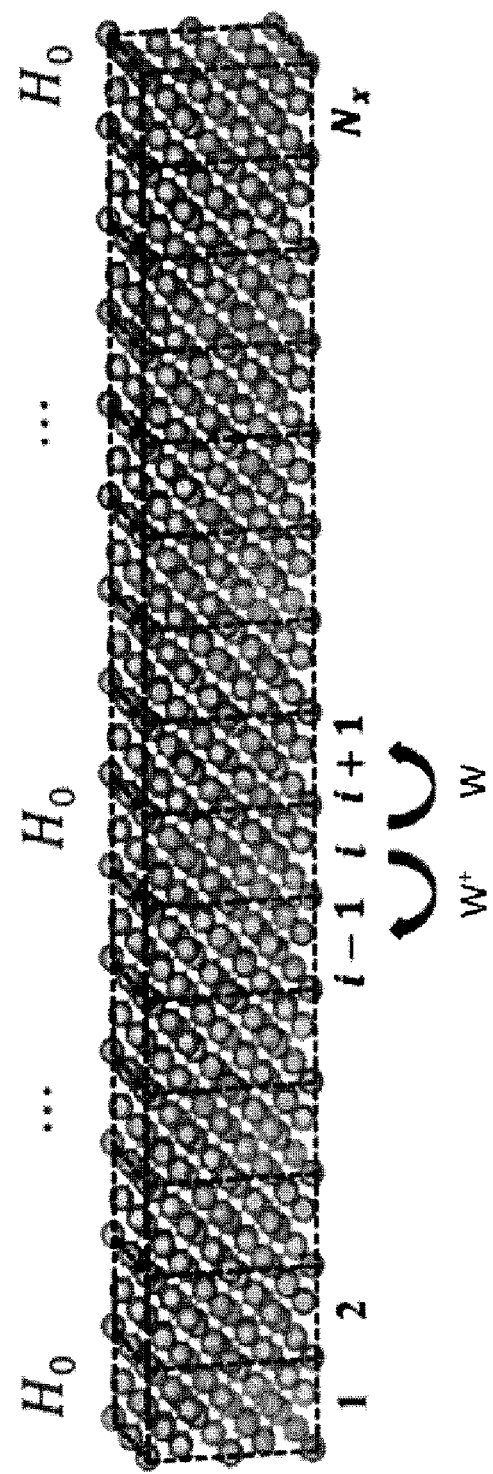
FIG. 2 is a view for explaining an example of a method for extracting a Hamiltonian in the simulation method of FIG. 1.

FIG. 2 is a view for explaining an example of a method for extracting a Hamiltonian in the simulation method of FIG. 1.

Referring to FIG. 2, the method for simulating the characteristics of the semiconductor device may include the extracting of the overlap matrix and the Hamiltonian representing the atomic interaction energy information of the target semiconductor device by using the DFT (S100).

As shown in FIG. 2, the overlap matrix and the Hamiltonian are calculated by setting an atomic structure such that the atomic structure is periodically arranged. In the structure of FIG. 2, N unit cells (N is a natural number) are periodically arranged.

Hamiltonian $H_0$ may be expressed in the form of a matrix based on atomic energy. For example, if there are five atoms in a unit cell, Hamiltonian $H_0$ is expressed by Equation 1 as follows.

$$\begin{bmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \end{bmatrix} = H_0 \quad (1)$$

In the above equation, $H_{ij}$ represents the energy of an atom, represents the energy of the $i^{th}$ atom itself when i and j are identical to each other, and represents the coupling energy between i and j when i and j are different from each other.

In the case of the unit cell structure of FIG. 2, the Hamiltonian matrix is expressed by Equation 2 as follows.

$$H = \begin{bmatrix} H_0 & W & 0 & & & & \\ W^+ & H_0 & W & \cdots & & 0 & \\ 0 & W^+ & H_0 & & & & \\ \vdots & & & \ddots & & & \vdots \\ & & & & H_0 & W & 0 \\ & 0 & & \cdots & W^+ & H_0 & W \\ & & & & 0 & W^+ & H_0 \end{bmatrix} \begin{matrix} 1 \\ 2 \\ 3 \\ \cdots \\ N-2 \\ N-1 \\ N \end{matrix} \quad (2)$$

In the above equation, H denotes a Hamiltonian matrix representing atomic relation in the target device, $H_0$ denotes a Hamiltonian matrix representing atomic relation in the unit cell, W denotes a matrix representing relation between an adjacent unit cell and the unit cell, and $W^+$ denotes a Hermitian matrix of W. However, W may include relation with unit cells which are spaced farther away. For example, as shown in FIG. 2, the energy relation between the $i^{th}$ unit cell and the $(i+1)^{th}$ unit cell may be calculated as W, and the energy relation between the $i^{th}$ unit cell and the $(i-1)^{th}$ unit cell may be calculated as W.

In one embodiment, $H_0$, W, and $W^+$ may be obtained through generally known DFT calculations. In addition, the Schrödinger equation for the unit cells is expressed by Equation 3 and Equation 4 as follows, from which an energy-k relation, that is, an energy-k band diagram, can be obtained.

$$H\Psi = ES\Psi \quad (3)$$

$$\begin{pmatrix} \ddots & W & \\ W^\dagger & H_0 & W \\ & W^\dagger & \ddots \end{pmatrix} \Psi = E \begin{pmatrix} \ddots & S_1 & \\ S_1^\dagger & S_0 & S_1 \\ & S_1^\dagger & \ddots \end{pmatrix} \Psi \quad (4)$$

In the above equation, H denotes a Hamiltonian matrix, S denotes a overlap matrix, E denotes an eigenvalue, and $\Psi$ denotes a Bloch state. In addition, a size of the Hamiltonian matrix H is defined as Ndft×Ndft. Ndft is proportional to the number of atoms contained in a single unit cell and the number of orbitals per atom, and a size of Ndft may be determined according to a degree of atomic interaction.

The energy-k relation in a repeating structure of the semiconductor device is expressed by Equation 5 and Equation 6 as follows.

$$H_k\Psi_k = ES_k\Psi_k \quad (5)$$

$$H_k = H_0 e^{ik}W + e^{-ik}W^+$$

$$S_k = S_0 + e^{ik}S_1 + e^{-ik}S_1^+ \quad (6)$$

Figure 3:
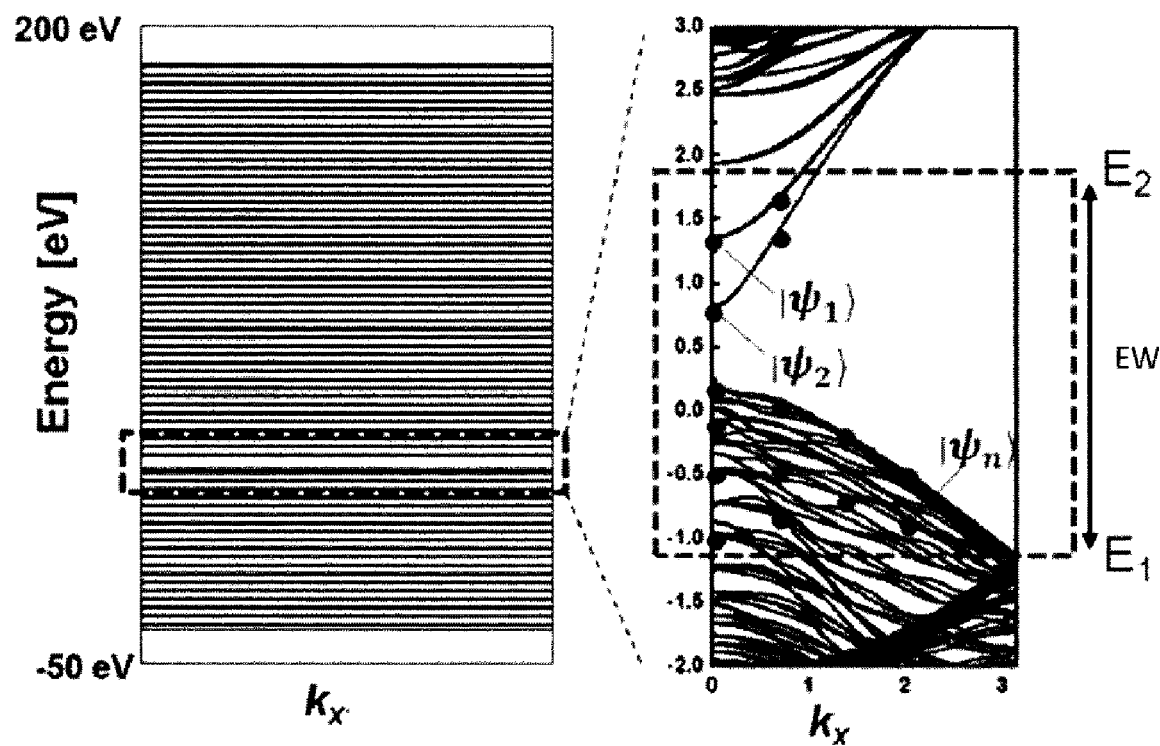
FIG. 3 is a view for explaining an example of Bloch states in the simulation method of FIG. 1.

In other words, the E-k energy band diagram showing the energy band structure as shown in FIG. 3 is calculated by solving the eigenfunctions in Equation 5 to obtain the energy E for each k. In this case, E denotes energy, and k denotes a wave number.

As described above, the overlap matrix S and the Hamiltonian matrix H taking into consideration the atomic interaction are calculated by the DFT, and the E-k energy band structure are calculated by solving the Schrödinger equation for the overlap matrix S and the Hamiltonian matrix H. In addition, Bloch states may be calculated based on the E-k energy band structure, the Hamiltonian matrix H, and the overlap matrix S.

Figure 4A:
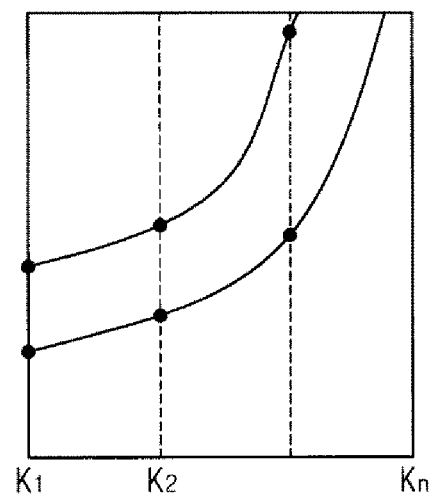
FIGS. 4A and 4B are views for explaining examples of calculating the Bloch states of FIG. 3.
Figure 4B:
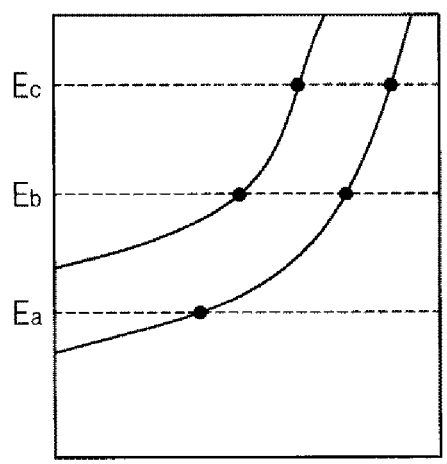

FIG. 3 is a view for explaining an example of Bloch states in the simulation method of FIG. 1, and FIGS. 4A and 4B are views for explaining examples of calculating the Bloch states of FIG. 3.

Referring to FIGS. 3 to 4B, the Bloch states $\Psi$ for corresponding energies are calculated based on the Hamiltonian H, the overlap matrix S, and the energy-k relation within an effective energy region EW (S200).

The Bloch states $\Psi$ are expressed as a wave function for a particle on a periodic potential.

The effective energy region EW is set based on at least one of a conduction band edge and a valence band edge depending on a type of the semiconductor device. In general, when the energy band is calculated by the DFT calculation, as shown in FIG. 3, an energy band within a range of – several hundreds of eV to + several hundreds of eV is outputted. However, in the case of semiconductor devices, only the energy near a forbidden band region influences a transport calculation or the like. Therefore, the simulation can be performed by setting only the energy region near the forbidden band region other than an entire energy region as the effective energy region EW.

For example, in the case of an n-channel metal oxide semiconductor (NMOS) transistor, the effective energy region EW may be set as a region between an energy level E1 obtained by subtracting the lowest energy level from the conduction band edge and an energy level E2 obtained by adding the highest energy level to the conduction band edge. In the case of a p-channel metal oxide semiconductor (PMOS) transistor, the effective energy region EW may be set as a region between an energy level E1 obtained by subtracting the lowest energy level from the valence band edge and an energy level E2 obtained by adding the highest energy level to the valence band edge. In the case of a tunnel type transistor, the effective energy region EW may be set as a region between an energy level E1 obtained by subtracting the lowest energy level from the valence band edge and an energy level E2 obtained by adding the highest energy level to the conduction band edge.

The Bloch state $\Psi$ may be calculated from the Hamiltonian H and the overlap matrix S within a range of the effective energy region EW through an eigenvalue problem. In one embodiment, as shown in FIG. 4A, the Bloch states $\Psi$ may be calculated every predetermined interval k, and a range of k is expressed by Equation 7 as follows.

$$k_p = \frac{2\pi p}{n_p} - \pi; \quad p = 1, 2, \ldots, n_p. \quad (7)$$

Figure 6A:
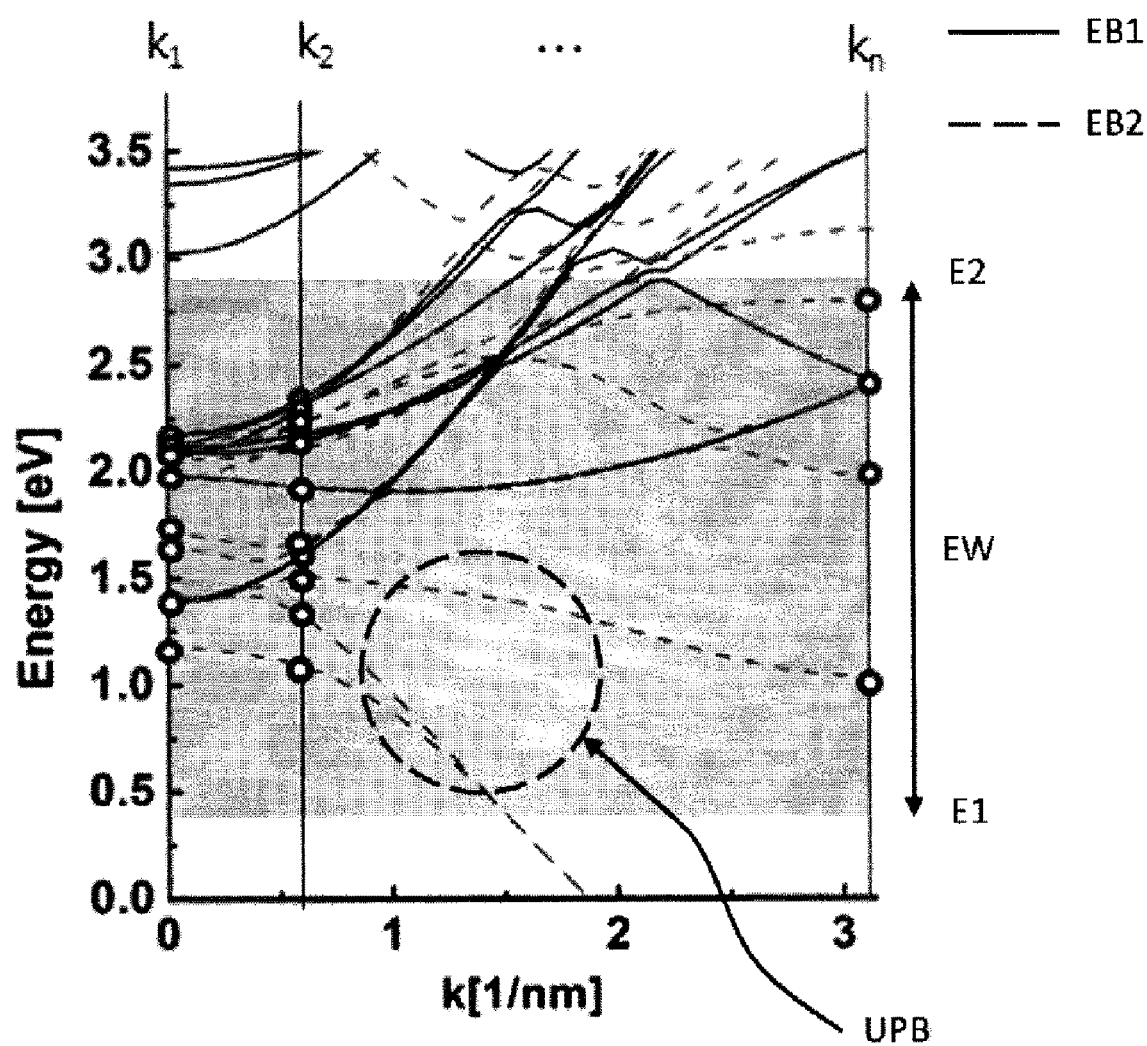
FIGS. 6A and 6B are graphs showing examples of the method for calculating the final transformation matrix and the final energy band structure of FIG. 5.

Accordingly, the Bloch states $\Psi$ such as points shown according to a value of k in FIGS. 4A and 6A are calculated.

In another embodiment, as shown in FIG. 4B, the Bloch states $\Psi$ may be calculated through an eigenvalue problem based on a specific energy value within the effective energy region EW.

The Bloch states $\Psi$ calculated within the effective energy region EW are expressed by Equation 8 as follows.

$$\overline{U}_0 = (\Psi_{v_1 k_1} \Psi_{v_2 k_1} \ldots \Psi_{v_1 k_2} \Psi_{v_2 k_2} \ldots) \quad (8)$$

In this case, $\overline{U}_0$ denotes a matrix containing the Bloch states, and vnkm represents an $n^{th}$ subband within the effective energy region EW in km. A size of the matrix $\overline{U}_0$ may be determined as Ndft×No, wherein No denotes a total number of selected Bloch states.

A transformation matrix Uo, which is a normal orthogonal basis of the matrix $\overline{U}_0$, may be calculated by orthonormalizing the matrix $\overline{U}_0$ and removing unnecessary states (terms contained in the matrix) from the orthonormalized matrix. Through the orthonormalization and state removal processes, the transformation matrix Uo may have a size of Ndft×Nmode. In this case, Nmode corresponds to a size much smaller than Ndft, and the size of the transformation matrix Uo is reduced by the orthonormalization. In addition, the removed states may be removed because the removed states are terms that substantially do not influence the calculation of the energy band structure in the effective energy region EW.

When an initial value of the transformation matrix Uo is regarded as U, a reduced Hamiltonian H' and a reduced overlap matrix S' are obtained by reducing a size of a Hamiltonian $H_k$ and an overlap matrix $S_k$. In other words, the reduced Hamiltonian H' and the reduced overlap matrix S' in relation to k are expressed by Equation 9 as follows.

$$H_k' = U^+ H_k U$$

$$S_k' = U^+ S_k U \quad (9)$$

In the above equation, $H_k'$ and $S_k'$ denote the reduced Hamiltonian H' and the reduced overlap matrix S' in relation to k, respectively, U denotes the initial value of the transformation matrix Uo, $U^+$ denotes an Hermitian matrix of U, and $H_k$ and $S_k$ denote the Hamiltonian H and the overlap matrix S in relation to k, respectively.

Accordingly, the Hamiltonian H and the overlap matrix S having a size of Ndft×Ndft can be converted into the reduced Hamiltonian H' and the reduced overlap matrix S' having a size of Nmode×Nmode, respectively.

Therefore, the size of the Hamiltonian and the overlap matrix may be significantly reduced, and subsequent operations can be performed. However, there is a need for a method or algorithm that accurately simulates the energy band structure of the target semiconductor device by using the reduced Hamiltonian and the reduced overlap matrix.

Figure 5:
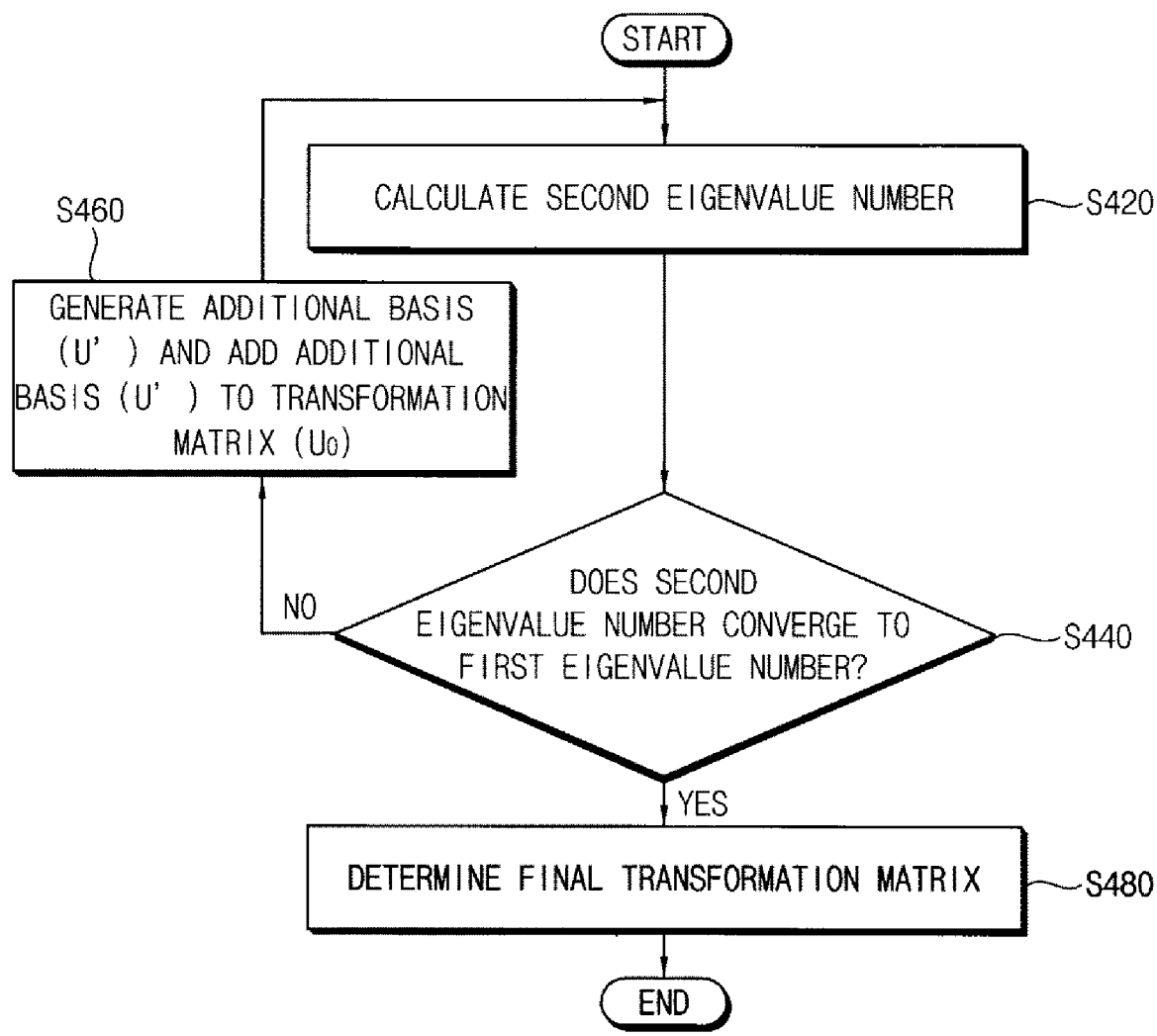
FIG. 5 is a flowchart for explaining an example of a method for calculating a final transformation matrix and a final energy band structure in the simulation method of FIG. 1.
Figure 6B:
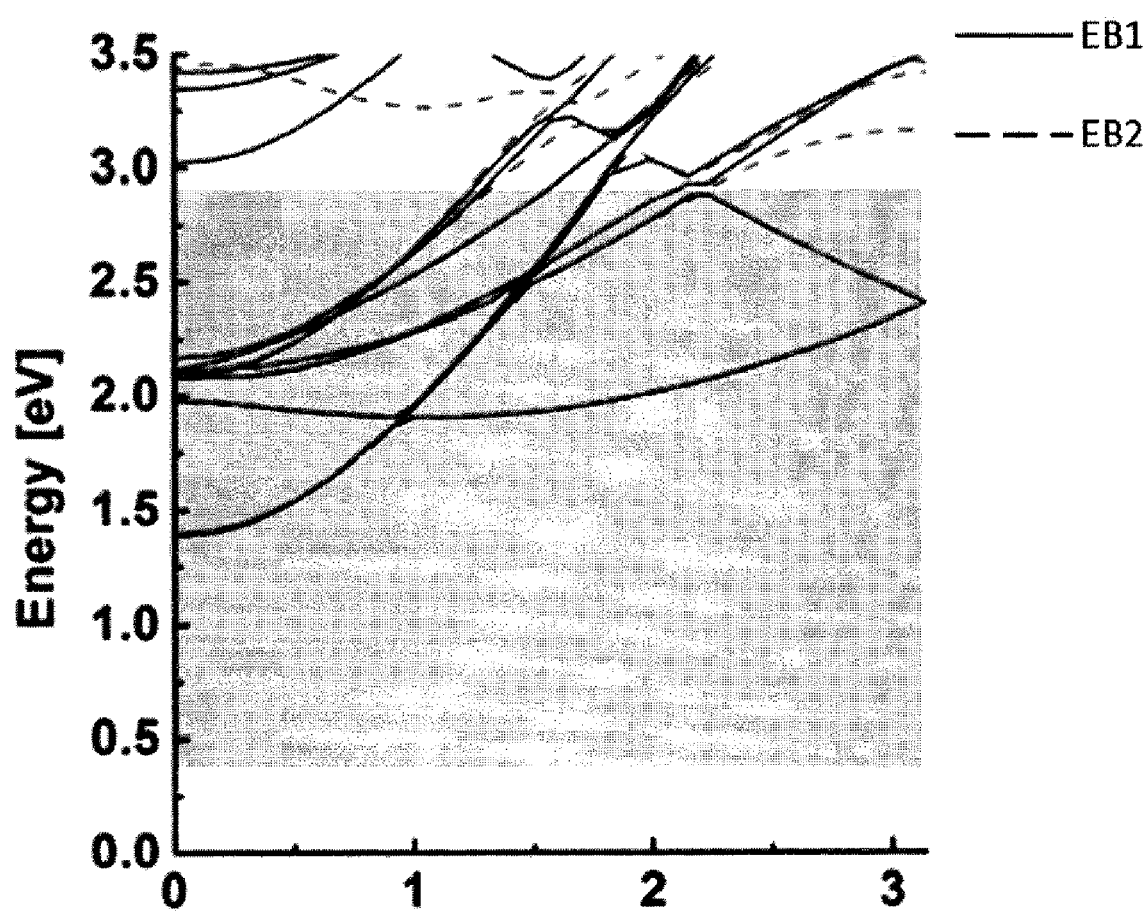

FIG. 5 is a flowchart for explaining an example of a method for calculating a final transformation matrix and a final energy band structure in the simulation method of FIG. 1, and FIGS. 6A and 6B are graphs showing examples of the method for calculating the final transformation matrix and the final energy band structure of FIG. 5.

Referring to FIGS. 5 to 6B, the final transformation matrix and the final energy band structure are calculated where all unphysical branches UPB, which are energy bands not corresponding to a first energy band structure (expressed as EB1 in FIGS. 6A and 6B) in a second energy band structure (expressed as EB2 in FIGS. 6A and 6B), are removed within the effective energy region EW by comparing the first energy band structure EB1 calculated based on the Hamiltonian H and the overlap matrix S with the second energy band structure EB2 calculated based on the first reduced Hamiltonian H' and the first reduced overlap matrix S' (S400).

As shown in FIG. 6A, the first energy band structure EB1 may be a result of extracting an eigenfunction obtained by Equation 3 and the initially calculated Hamiltonian H and overlap matrix S, and the second energy band structure EB2 may be a result of extracting the eigenfunction obtained by Equation 3, the reduced Hamiltonian H', and the reduced overlap matrix S'. In this case, the unphysical branches UPB not corresponding to the first energy band structure EB1 among the second energy band structure EB2 negatively influence the accuracy of the characteristic calculation (for example, the transport calculation), so that an operation to remove the unphysical branches UPB has to be performed.

In one embodiment, the unphysical branches UPB may be removed by comparing a first eigenvalue number, which is the number of eigenvalues of the first energy band structure EB1, with a second eigenvalue number, which is the number of eigenvalues of the second energy band structure EB2, within the effective energy region EW, and then repeatedly adding an additional basis U' to the transformation matrix Uo until the second eigenvalue number converges to the first eigenvalue number. In other words, the second eigenvalue number may be calculated (S420), the first eigenvalues number may be compared with the second eigenvalue number (S440), a first additional basis may be added to the transformation matrix Uo by generating the first additional basis for removing the unphysical branches UPB from the effective energy region EW when the second eigenvalue number is greater than the first eigenvalue number (S460), and the transformation matrix to which the first additional basis is added may be determined as the final transformation matrix when the second eigenvalue number converges to the first eigenvalue number (S480). In this case, the energy band structure obtained by the final transformation matrix may be substantially the same as an actual energy band structure of the target semiconductor device. In one embodiment, the convergence of the second eigenvalue number to the first eigenvalue number is defined as a case in which the second eigenvalue number is equal to the first eigenvalue number, or equal to or less than a sum of the first eigenvalue number and a preset range. In other words, the second eigenvalue number cannot be smaller than the first eigenvalue number.

In one embodiment, the process of adding the additional basis to the transformation matrix Uo may include repetition of recalculating the second eigenvalue number, and generating and adding the additional basis to the transformation matrix until the second eigenvalue number converges to the first eigenvalue number. For example, it is possible to repeat the process in which the second eigenvalue number is recalculated in an energy band obtained by the transformation matrix to which the first additional basis is added when the second eigenvalue number is greater than the first eigenvalue number (or the second eigenvalue number deviates from the first eigenvalue number more than a preset range), and a second additional basis is added to the transformation matrix by generating the second additional basis for removing the unphysical branches UPB from the effective energy region EW when the recalculated second eigenvalue number is greater than the first eigenvalue number as a result of comparing the recalculated second eigenvalue number with the first eigenvalue number. For example, if the process of updating the transformation matrix Uo by adding the additional basis is repeated for n times, first to $n^{th}$ additional bases U1' to Un' are added to the transformation matrix Uo so that the final transformation matrix U may be finally calculated. In other words, the final transformation matrix U is expressed by Equation 10 as follows.

$$U = [U_o U1' \ldots Un'] \quad (10)$$

The final transformation matrix U may provide an energy band structure in which all unphysical branches UPB have been removed within the effective energy region EW.

The first and second eigenvalue numbers may be calculated based on Equation 11 as follows (S420).

$$N = \left\langle \frac{z - \varepsilon_c}{z - \varepsilon} \right\rangle = \frac{1}{2n_z} \sum_{j=1}^{2n_z} \frac{z_j - \varepsilon_c}{z_j - \varepsilon} \text{ with } \varepsilon_c = (\varepsilon_1 + \varepsilon_2)/2, \quad (11)$$

$$z_k = \varepsilon_c + e^{ik/n_z(k-\frac{1}{2})}(\varepsilon_1 - \varepsilon_2)/2$$

When a natural number Nz is sufficiently large, N=1 is outputted when an input c is in the range [ε1:ε2], and N=0 is outputted otherwise. Therefore, when Equation 11 is transformed into Equation 12 corresponding to the matrix in order to apply Equation 11 to the Hamiltonian H, the number of eigenvalues (for example, the first eigenvalue number or the second eigenvalue number) in a specific energy region may be calculated.

$$F[U] = \left\langle \sum_k Tr \left[ \frac{1}{z - S_k'^{-1} H_k'} \right] (z - \varepsilon_c) \right\rangle \quad (12)$$

In the above equation, since $S^{-1}H$ corresponds to ε, F[U] represents the number of eigenvalues in the effective energy region EW at the set k value, that is, the number of eigenvalues.

Therefore, as shown in FIG. 6A, the number of eigenvalues for each k value, that is, the second eigenvalue number is calculated in the second energy band structure EB2 calculated from the reduced Hamiltonian H' and the reduced overlap matrix S' by Formula 12. Similarly, the number of eigenvalues for each k value, that is, the first eigenvalue number is calculated in the first energy band structure EB1 calculated from the initial Hamiltonian H and overlap matrix S.

The first and second eigenvalue numbers calculated by the above method are compared with each other (S440), and the additional basis U' may be generated and added to the transformation matrix U when the second eigenvalue number is greater than the first eigenvalue number (S460). The additional basis U' is calculated by Equation 13.

$$U' = \frac{1}{\sqrt{C^T C}} \Xi C. \quad (13)$$

In the above equation, U' denotes the additional basis added to the transformation matrix U, C denotes a variable vector, and Ξ denotes an arbitrary matrix having an arbitrary size for removing the unphysical branches UPB. In addition, Ξ may have a size of Ndft×Nr, and C may have a size of Nr×1. Since an Nr term is canceled by a product of Ξ and C, the size of Nr may be arbitrarily set.

Therefore, the additional basis U' may be determined according to a value of the variable vector C.

In one embodiment, the additional basis U' may be generated based on the variable vector C that maximizes an absolute value of a difference between the second eigenvalue number obtained by an $i^{th}$ transformation matrix (wherein i is a natural number) to which an $i^{th}$ additional basis is applied, and the second eigenvalue number obtained by an $(i-1)^{th}$ transformation matrix to which an $(i-1)^{th}$ additional basis is applied. In other words, based on Equation 12 for calculating an eigenvalue number (F[U]), the difference between the second eigenvalue numbers is expressed by Equation 14 as follows.

$$\Delta F = F[U_i] - F[U_{i-1}] \quad (14)$$

For example, ΔF in case of i=1 indicates a value obtained by subtracting a second eigenvalue obtained by the initially calculated transformation matrix from a second eigenvalue obtained by the transformation matrix to which the first additional basis U1' is added. In other words, ΔF=F[Uo U1']−F[Uo], wherein ΔF is always outputted as a negative number, and the variable vector C that maximizes an absolute value of ΔF has to be calculated. In other words, the variable vector C at which ΔF is minimized has to be calculated. In other words, the unphysical branches UPB can be maximally removed when ΔF is minimized.

When Equation 14 is expanded using Equation 12 and Equation 13, Equation 15 to Equation 17 are calculated as follows.

$$\Delta F(C) = \mathrm{Re}\left\{\frac{1}{n_z}\sum_{q=1}^{n_q}\sum_{j=1}^{n_z}\frac{C^T A(k_q, z_j)C}{C^T B(k_q, z_j)C}(z_j - \epsilon_c)\right\} + (C^T C - 1)^2 \quad (15)$$

$$A(k, z) = \Xi^\dagger(\Lambda_c U \tilde{\Lambda}^{-1} \tilde{S}_k \tilde{\Lambda}^{-1} U^\dagger \Lambda - S_k^\dagger U \tilde{\Lambda}^{-1} U^\dagger \Lambda - \Lambda_c U \tilde{\Lambda}^{-1} U^\dagger S_k + S_k)\Xi, \quad (16)$$

$$B(k, z) = \Xi^\dagger(\Lambda - \Lambda_c U \tilde{\Lambda}^{-1} U^\dagger \Lambda)\Xi,$$

$$\Lambda(k, z) = z S_k - H_k, \quad (17)$$
$$\Lambda_c(k, z) = z S_k^\dagger - H_k^\dagger,$$
$$\tilde{\Lambda}(k, z) = z \tilde{S}_k - \tilde{H}_k,$$

In this case, matrices and scalar values except for the variable vector C are fixed values, and a degree of removing the unphysical branch UPB may be determined according to the value of the variable vector C. In order to find the variable vector C that minimizes an output of ΔF(C) in Equation 15, ΔF(C) may be set as an input value of a minimization scheme (or a minimization function), so that the variable vector C may be calculated through the minimization scheme. Any generally known minimization scheme can be used. For example, an optimal variable vector C may be calculated from ΔF(C) using the minimization scheme such as a conjugate gradient method. The $i^{th}$ additional basis (e.g., Ui') may be calculated by applying the calculated variable vector C to Equation 13, and the $i^{th}$ transformation matrix Ui to which the $i^{th}$ additional basis is applied may be calculated.

In one embodiment, the second eigenvalue number for the $i^{th}$ transformation matrix Ui may be recalculated through Equation 12 (S420), and compared again with the first eigenvalue number (S440). When the second eigenvalue number is greater than the first eigenvalue number, an $(i+1)^{th}$ additional basis may be calculated by the above-described additional basis calculation operation, and an $(i+1)^{th}$ transformation matrix may be recalculated therefrom.

In this manner, the transformation matrix may be updated by repeating the steps S420 to S460 until the second eigenvalue number converges to the first eigenvalue number.

When the second eigenvalue number converges to the first eigenvalue number, the initial transformation matrix U or the transformation matrix U to which the additional basis is added may be determined as the final transformation matrix (S480). In other words, the final transformation matrix can be calculated through the repetition of removing the unphysical branches UPB, and the final energy band structure as shown in FIG. 6B can be calculated.

Figure 7:
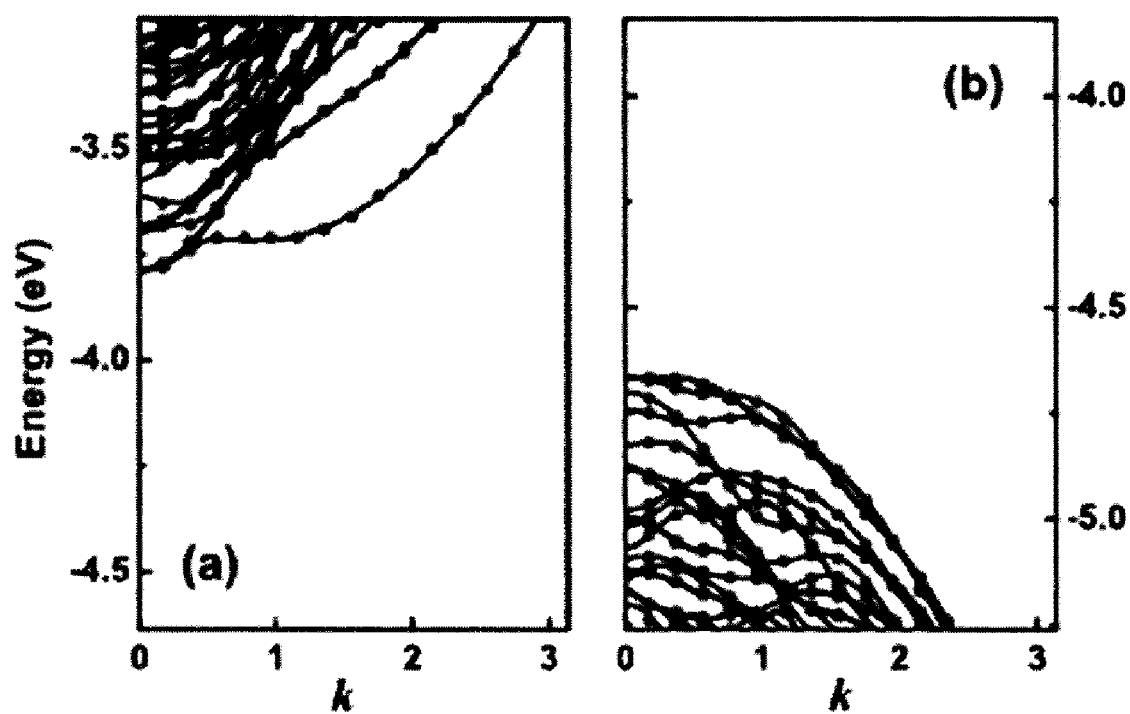
FIG. 7 is a graph showing an example of the energy band structure calculated by the simulation method of FIG. 1.

FIG. 7 is a graph showing an example of the energy band structure calculated by the simulation method of FIG. 1.

Referring to FIGS. 1 to 7, the energy band structure of the target semiconductor device can be accurately implemented by the method for simulating the characteristics of the semiconductor device according to the present invention.

The energy band structure can be calculated based on more accurate information about the atomic structure included in the semiconductor device by using the DFT, and a precise simulation can be implemented for an actual size of a several-nanometer semiconductor device having a structure such as the UTB and nanowire structures in addition to the bulk structure.

In addition, a simulation for an actual semiconductor device is performed based on a method of reducing the size of the DFT Hamiltonian, that is, a method of reconstructing the Hamiltonian and the overlap matrix into the reduced Hamiltonian and the reduced overlap matrix, so that a precise simulation result can be obtained while the required memory and time, which are a problem of conventional DFT calculation, are significantly reduced.

Figure 8:
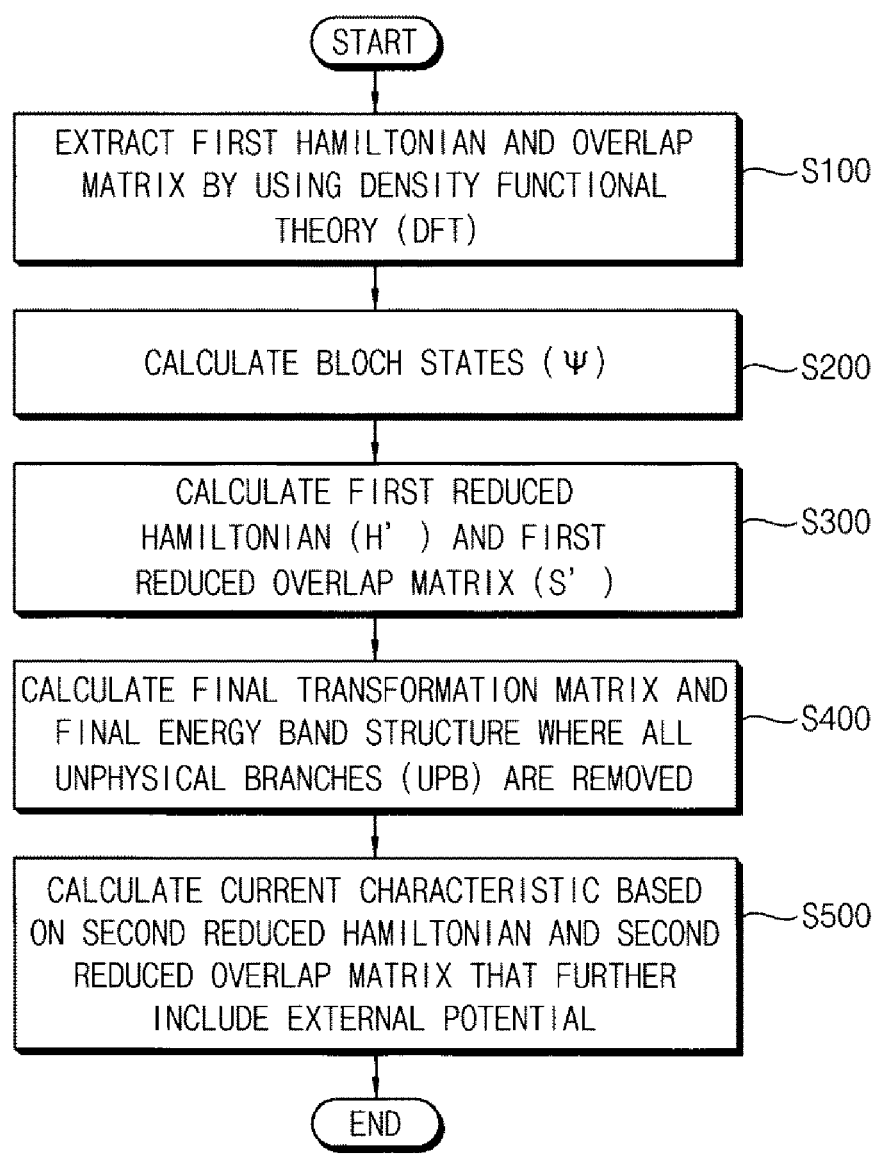
FIG. 8 is a flowchart for explaining an example of the method for simulating the characteristics of the semiconductor device of FIG. 1.
Figure 9:
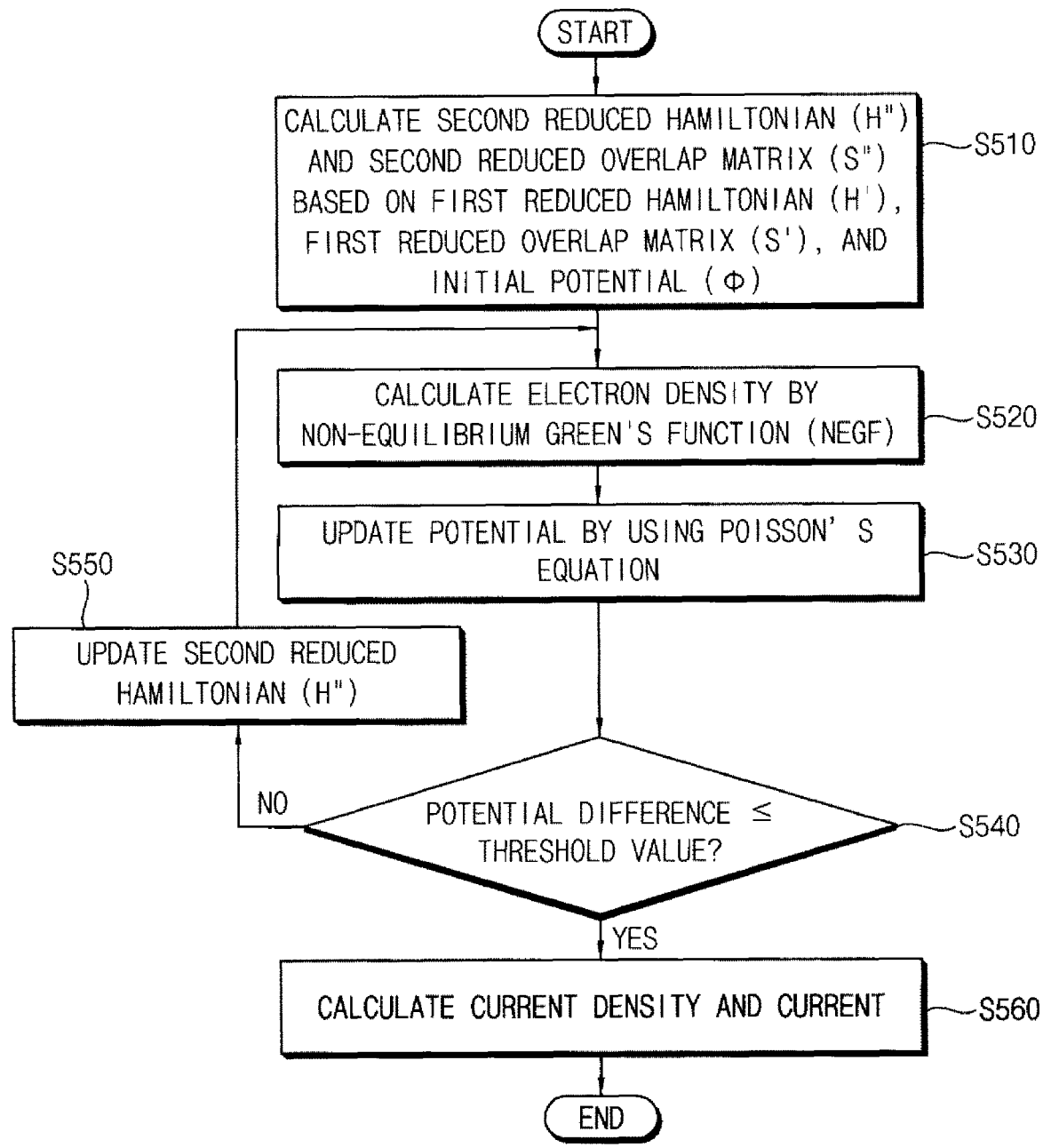
FIG. 9 is a flowchart for explaining an example of a method for calculating a current characteristic of FIG. 8.

FIG. 8 is a flowchart for explaining an example of the method for simulating the characteristics of the semiconductor device of FIG. 1, and FIG. 9 is a flowchart for explaining an example of a method for calculating a current characteristic of FIG. 8.

Referring to FIGS. 8 and 9, the method for simulating the characteristics of the semiconductor device may calculate an energy band structure and a current characteristic of the target semiconductor device.

Since the steps S100 to S400 have been described above with reference to FIGS. 1 to 7, redundant descriptions thereof will be omitted.

The method for simulating the characteristics of the semiconductor device may further include calculating a current characteristic of the target semiconductor device based on a second reduced Hamiltonian H" and a second reduced overlap matrix S" that further include an external potential (φ) component (S500).

In one embodiment, the second reduced Hamiltonian H" and the second reduced overlap matrix S" may be calculated based on the first reduced Hamiltonian H' and the first reduced overlap matrix S' generated by the steps S100 to S400 and the initial potential φ, which is a preset external potential component (S510), an electron density may be calculated by applying the second reduced Hamiltonian H" and the second reduced overlap matrix S" to the NEGF (S520), the initial potential may be updated by applying the electron density to the Poisson's equation (S530), and a potential difference between the initial potential and the updated potential of the second reduced Hamiltonian may be calculated (S540). A current density and a current may be calculated by using the updated potential when the potential difference is equal to or less than a preset threshold value (S560). The second reduced Hamiltonian H" may be updated with the updated potential when the potential difference exceeds the threshold value (S550).

The second reduced Hamiltonian H" and the second reduced overlap matrix S" may be calculated based on the initial potential φ, the first reduced Hamiltonian H', and the first reduced overlap matrix S' (S520). For example, the initial potential φ may be a value in which an electrostatic effect, a strain effect, and the like are reflected. However, since the embodiment is given for illustrative purpose, variables included in the potential are not limited thereto.

In one embodiment, the Schrödinger equation where the second reduced Hamiltonian H" and the second reduced overlap matrix S" are applied is obtained by modifying Equation 3, and is expressed by Equation 18 as follows.

$$(H_0 + \tfrac{1}{2}(SV + VS))\Psi = E S \Psi \quad (18)$$

In the above equation, $H_0+\frac{1}{2}(SV+VS)$ represents the second reduced Hamiltonian H" in which the initial potential φ is added to the first reduced Hamiltonian H', Ho denotes the first reduced Hamiltonian H' based on atomic energy, S denotes the first reduced overlap matrix S', V denotes a potential matrix, E denotes an eigenvalue, and Ψ denotes the Bloch state.

In detail, the second reduced Hamiltonian H" is expressed by Equation 19 and Equation 20 as follows.

$$\mathcal{H} = \begin{pmatrix} H_{1,1} & H_{1,2} & 0 & \cdots \\ H_{2,1} & H_{2,2} & H_{2,3} & \\ 0 & H_{3,2} & \ddots & \\ \vdots & & & H_{8,8,} \end{pmatrix} \quad (19)$$

$$H_{i,j} = H_0 + (S_0 V_i + V_i S_0)/2, \quad (20)$$
$$H_{i,j+1} = W + (S_1 V_{i+1} + V_i S_1)/2,$$
$$H_{i,j-1} = W^\dagger + (S_1^\dagger V_{i-1} + V_i S_1^\dagger)/2.$$

Accordingly, the second reduced Hamiltonian H" may indicate a value to which both adjacent atomic energy and external potential are applied. The Hamiltonian H and the overlap matrix S having the size of Ndft×Ndft can be converted into the second reduced Hamiltonian H" and the second reduced overlap matrix S" having the size of Nmode×Nmode according to the above-described reduction method, respectively.

Thereafter, the electron density may be calculated by applying the second reduced Hamiltonian H" and the second reduced overlap matrix S" to the NEGF (S520), the potential may be updated by applying the electron density to the Poisson's equation (S530), and the potential difference between the potential and the updated potential of the second reduced Hamiltonian may be calculated (S540). The second reduced Hamiltonian H" may be updated with the updated potential when the potential difference exceeds the threshold value (S550). In one embodiment, a hole density may be calculated instead of the electron density.

In one embodiment, the potential and the second reduced Hamiltonian H" may be updated by repeating extraction of the Poisson's equation and the NEGF in a self-consistent scheme until the potential difference converges to the threshold value or less.

The method of calculating the current density and the current by using the self-consistent scheme of the Poisson's equation and the NEGF corresponds to a generally known calculation method, so the detailed description thereof will be omitted.

In other words, in the method of calculating the current density and the current according to embodiments of the present invention, the voltage-current characteristic is calculated based on the reduced Hamiltonian and the reduced overlap matrix having a reduced size with respect to the Hamiltonian and the overlap matrix obtained based on the DFT, so that the memory and an operation time can be remarkably reduced by the DFT.

Figure 10:
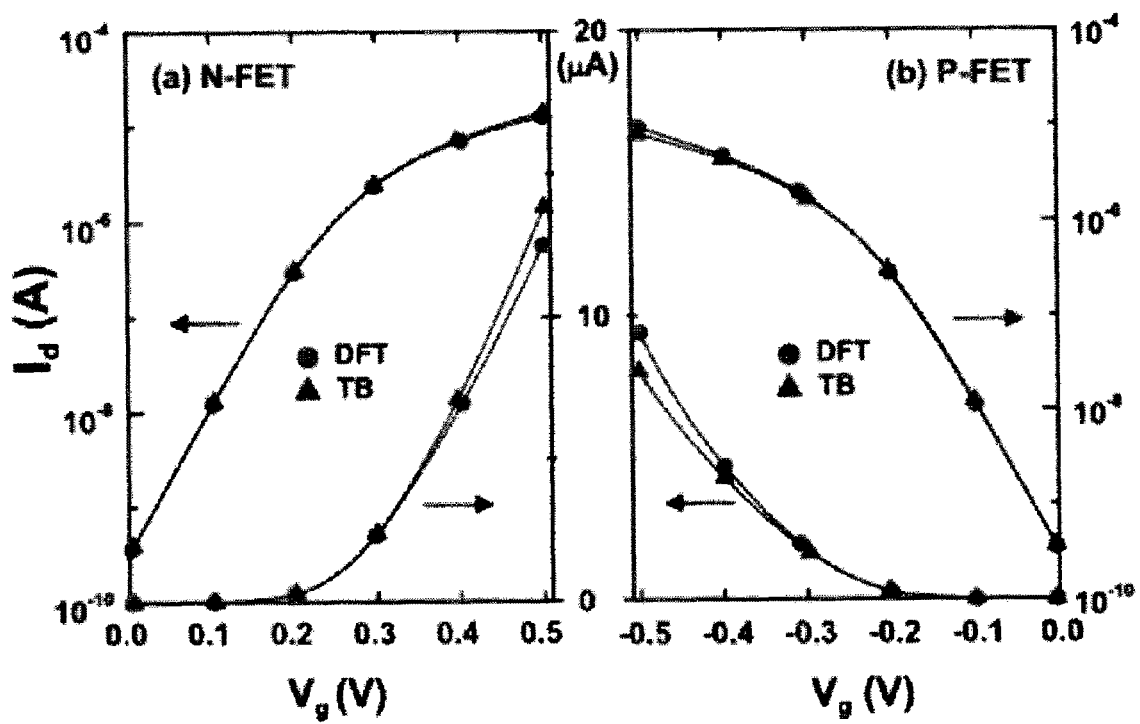
FIG. 10 is a graph showing an example of the semiconductor device characteristics calculated by the simulation method of FIG. 9.

FIG. 10 is a graph showing an example of the semiconductor device characteristics calculated by the simulation method of FIG. 9, and FIG. 11 is a view showing an example of a result in which an operation load is reduced by the method for simulating the characteristics of the semiconductor device according to embodiments of the present invention.

Referring to FIGS. 10 and 11, the method for simulating the characteristics of the semiconductor device may obtain an actual energy band structure based on the reduced Hamiltonian and the reduced overlap matrix, and voltage-current characteristics of a transistor can be obtained as a result of NEGF transport calculation based on the reduced Hamiltonian and the reduced overlap matrix.

FIG. 10 shows a simulation result for relation between a gate voltage and a drain current in an N-type FET and a P-type FET. As shown in FIG. 10, it is found that a result of simulation based on the conventional TB model and a transport operation result based on the DFT of the present invention show approximately the same performance.

In addition, as shown in FIG. 11, the matrix size of the Hamiltonian is reduced to about 2% by the method for simulating the semiconductor device of the present invention with respect to a semiconductor device having a nanowire structure of several nanometers, and thus a simulation time and required memory can be significantly reduced. Therefore, the energy band structure and the transport operation based on the DFT can be performed corresponding to the actual size of the semiconductor device, and the present invention can be applied to various semiconductor devices and coupling structures.

The present invention can be applied to a method of simulating characteristics of a semiconductor device and an apparatus for performing the simulation.

Although the present invention has been described with reference to embodiments thereof, it will be understood that various changes and modifications can be made by those skilled in the art without departing from the spirit and scope of the present invention as disclosed in the appended claims.

What is claimed is:

1. A method for simulating characteristics of a semiconductor device, the method comprising:
    extracting an overlap matrix and a Hamiltonian representing atomic interaction energy information of a target semiconductor device by using a density functional theory (DFT);
    calculating Bloch states for corresponding energies based on the Hamiltonian, the overlap matrix, and energy-k relation within an effective energy region;
    obtaining a first reduced Hamiltonian and a first reduced overlap matrix having a reduced matrix size by applying the Hamiltonian and the overlap matrix to a transformation matrix that is obtained by orthonormalizing a matrix representing the Bloch states; and
    calculating a final transformation matrix and a final energy band structure for the target semiconductor device, where all unphysical branches, which are energy bands not corresponding to a first energy band structure in a second energy band structure, are removed from the effective energy region by comparing the first energy band structure calculated based on the Hamiltonian and the overlap matrix with the second energy band structure calculated based on the first reduced Hamiltonian and the first reduced overlap matrix.

2. The method of claim 1, wherein the calculating of the final transformation matrix and the final energy band structure includes:
    calculating a second eigenvalue number, which is a number of eigenvalues included in the second energy band structure;
    comparing a first eigenvalues number, which is a number of eigenvalues included in the first energy band structure, with the second eigenvalue number;

adding an additional basis to the transformation matrix by generating the additional basis for removing the unphysical branches from the effective energy region when the second eigenvalue number is greater than the first eigenvalue number; and determining the transformation matrix to which the additional basis is added as the final transformation matrix when the second eigenvalue number converges to the first eigenvalue number.

3. The method of claim 2, wherein the adding of the additional basis to the transformation matrix includes:

recalculating the second eigenvalue number in an energy band obtained by an intermediate transformation matrix to which the additional basis is added; and adding a new additional basis to the transformation matrix by generating the new additional basis for removing the unphysical branches from the effective energy region when the recalculated second eigenvalue number is greater than the first eigenvalue number.

4. The method of claim 2, wherein the adding of the additional basis to the transformation matrix includes repetition of recalculating the second eigenvalue number, and generating and adding the additional basis to the transformation matrix until the second eigenvalue number converges to the first eigenvalue number.

5. The method of claim 4, wherein the additional basis is generated based on a variable vector calculated through a minimization function that maximizes an absolute value of a difference between the second eigenvalue number obtained by an ith transformation matrix (wherein i is a natural number) to which an ith additional basis is applied, and the second eigenvalue number obtained by an (i−1)th transformation matrix to which an (i−1)th additional basis is applied.

6. The method of claim 1, wherein the obtaining of the first reduced Hamiltonian and the first reduced overlap matrix includes:

generating a normal orthogonal basis obtained by orthonormalizing the matrix representing the Bloch states;

outputting the transformation matrix where states having a value smaller than a preset reference value are removed from the normal orthogonal basis; and outputting the first reduced Hamiltonian and the first reduced overlap matrix by applying the Hamiltonian and the overlap matrix to the transformation matrix.

7. The method of claim 1, wherein the effective energy region is set based on at least one of a conduction band edge and a valence band edge depending on a type of the semiconductor device.

8. The method of claim 1, wherein the Bloch states are calculated from the Hamiltonian and the overlap matrix by applying an eigenvalue extraction scheme for a Schrödinger equation.

9. The method of claim 1, further comprising calculating a current characteristic of the target semiconductor device based on a second reduced Hamiltonian and a second reduced overlap matrix where an initial potential, which is a preset external potential component, is added to the first reduced Hamiltonian and the first reduced overlap matrix.

10. The method of claim 9, wherein the calculating of the current characteristic of the target semiconductor device includes:

obtaining the second reduced Hamiltonian and the second reduced overlap matrix based on the first reduced Hamiltonian, the first reduced overlap matrix, and the initial potential;

calculating an electron density by applying the second reduced Hamiltonian and the second reduced overlap matrix to a non-equilibrium Green's function (NEGF);

updating the initial potential by applying the electron density to a Poisson's equation;

calculating a potential difference between the initial potential and the updated potential of the second reduced Hamiltonian;

calculating a current density and a current by using the updated potential when the potential difference is equal to or less than a preset threshold value; and updating the second reduced Hamiltonian with the updated potential when the potential difference exceeds the threshold value.

11. The method of claim 10, wherein the potential and the second reduced Hamiltonian are updated by repeating extraction of the Poisson's equation and the NEGF in a self-consistent scheme until the potential difference converges to the threshold value or less.

* * * * *